US008160940B2

(12) United States Patent
Laur (10) Patent No.: US 8,160,940 B2
(45) Date of Patent: Apr. 17, 2012

(54) MAKING AN AVAILABILITY DETERMINATION REGARDING A REQUESTED WARE

(75) Inventor: Fabrice Laur, Heidelberg (DE)

(73) Assignee: SAP AG, Walldorf (DE)

( * ) Notice: Subject to any disclaimer, the term of this patent is extended or adjusted under 35 U.S.C. 154(b) by 347 days.

(21) Appl. No.: 12/315,710

(22) Filed: Dec. 5, 2008

(65) Prior Publication Data

US 2010/0145830 A1     Jun. 10, 2010

(51) Int. Cl.
*G06Q 10/00* (2012.01)
(52) U.S. Cl. ............................... 705/28; 700/95; 700/97
(58) Field of Classification Search ........................ None
See application file for complete search history.

(56) References Cited

U.S. PATENT DOCUMENTS

| 6,064,982 | A * | 5/2000 | Puri ........................... 705/26.41 |
| 6,714,827 | B1 * | 3/2004 | Brown et al. ................... 700/97 |
| 7,590,937 | B2 * | 9/2009 | Jacobus et al. ................ 715/700 |
| 2007/0130024 | A1 * | 6/2007 | von Helmolt et al. .......... 705/26 |

OTHER PUBLICATIONS

"Building Block: Capable-to-Match" [online]. SAP, [retrieved on Dec. 5, 2008]. Retrieved from the Internet: <URL: http://help.sap.com/bestpractices/BBLibrary/HTML/S14_SCM_CTM_EN_DE.htm >.
"Pegging Logic: Not Fixed (Follow MRP Logic)" [online]. SAP [no date], [retrieved on Dec. 18, 2007]. Retrieved from the Internet: <URL: http://help.sap.com/saphelp_dimp50/helpdata/EN/dd/fl493a7dc7f822e10000000a114084/content.htm>.
"Pegging" [online]. SAP [no date], [retrieved on Dec. 18, 2007]. Retrieved from the internet: <URL: http://help.sap.com/saphelp_di46c2/helpdata/EN/1d/e1073e254411d2b40c006094b9c9be/content.htm>.
"SAP Manufacturing: Manufacturing Planning—Production Planning and Scheduling" [online]. SAP [no date], [retrieved on Dec. 18, 2007]. Retrieved from the intenet: <URL: http://www50.sap.com/businessmaps/0CA10EC69EDD4209918258122C9FFC7F.htm>.
"*Portfolio Enterprise Planning by Arthur: The Next Generation in Precision Planning*", JDA Portfolio*Enabled* Planning & Forecasting Soution, (Apr. 2005).
"Supply Chain Software: Review of i2's Business Content Libraries" [online]. Supply Chain Digest Jul. 2006, [retrieved on Dec. 18, 2007]. Retrieved from the internet <URL: http://www.scdigest.com/Assets/Product_Reviews/07-06-11.php?cid=1082>.
*JD Edwards World Requirements Planning*, ORACLE Data Sheet (2004, 2005).
*Microsoft Business Solutions—Navision*, Microsoft Business Solutions (2004), p. 1-6.
*Oracle Manufacturing Material Planning For Process Manufacturing*, ORACLE Data Sheet (2006).
"Real time capable Wassermann software to plan pharmaceutical production and control processes" [online]. Wassermann AG, Aug. 20, 2007, [retrieved on Dec. 18, 2007]. Retrieved from the internet: <URL: http://www.wassermann.com/en/presse/pressemitteilungen/pm_2007/07_08_20_PM_boe...>.

* cited by examiner

*Primary Examiner* — Faris Almatrahi
(74) *Attorney, Agent, or Firm* — Fish & Richardson P.C.

(57) ABSTRACT

Among other disclosed subject matter, a computer-implemented method for making an availability determination regarding a requested ware includes identifying a first request to provide a quantity of a ware at a first date. The method includes recording, in response to the first request, a second request for a critical part of the ware, the second request to be satisfied at a second date selected using the first date. The method includes determining a confirmation date for the critical part based on the second request. The method includes generating a confirmation for the first request using the confirmation date.

13 Claims, 7 Drawing Sheets

MAKING AN AVAILABILITY DETERMINATION REGARDING A REQUESTED WARE

TECHNICAL FIELD

This document relates to making an availability determination regarding a requested ware.

BACKGROUND

Organizations can use computer-based systems to control some aspects of supplying products or other wares. For example, a supply chain management system can be used to plan and/or execute the manufacture or procurement of goods that are to be sold to customers. Such systems can allow certain aspects of the process to be scheduled and specified, such as the amount of goods needed, when the delivery should take place, what machinery or other resources are to be used, to name a few examples. An output of a system can be a confirmation that a requested order for a ware can be satisfied by a requested date.

Some systems have separate planning components. A planning component can be used to plan the requirements for one or more materials, such as a raw material or a product. The output of a planning component can be based on forecasts of what future demands will be, and the plan can then be used to organize, analyze and/or execute operations in the organizations.

SUMMARY

The invention relates to making an availability determination.

In a first aspect, a computer-implemented method for making an availability determination regarding a requested ware includes identifying a first request to provide a quantity of a ware at a first date. The method includes recording, in response to the first request, a second request for a critical part of the ware, the second request to be satisfied at a second date selected using the first date. The method includes determining a confirmation date for the critical part based on the second request. The method includes generating a confirmation for the first request using the confirmation date.

Implementations can include any or all of the following features. The confirmation date can be consistent with the second date, and the confirmation can indicate that the first request is confirmed to be satisfied by the first date. The confirmation date can be inconsistent with the second date, and the confirmation can indicate a third date, later than the first date, when the first request is confirmed to be satisfied.

The method can further include identifying a replenishment lead time associated with producing the ware; and defining the second date as the first date less the replenishment lead time. The method can further include identifying one of a plurality of supply scopes associated with the critical part for making an availability determination; and making the availability determination using the identified supply scope. The ware can be scheduled to be produced according to an assemble-to-order process in which the ware is produced by assembling components including the critical part that have been produced according to a make-to-stock process ahead of the first request. The critical part can form a decoupling point between the make-to-stock process and the assemble-to-order process. Generating the confirmation can include performing a first availability determination for the critical part regarding the second date; and performing a second availability determination for the ware regarding the first date. The first availability determination can be performed using one of a plurality of supply scopes associated with the critical part for making an availability determination. The second availability determination can be performed using one of a plurality of supply scopes associated with the ware for making an availability determination. The critical part can be defined as made of at least one critical subpart, and the method can further include performing a third availability determination for the critical subpart, wherein the first availability determination takes into account the third availability determination. A criterion for specifying that the part is to be recognized as the critical part can be that the part has a potential of delaying assembly of the ware.

In a second aspect, a computer program product is tangibly embodied in a computer-readable storage medium and includes instructions that when executed by a processor perform a method for making an availability determination regarding a requested ware. The method includes identifying a first request to provide a quantity of a ware at a first date. The method includes recording, in response to the first request, a second request for a critical part of the ware, the second request to be satisfied at a second date selected using the first date. The method includes determining a confirmation date for the critical part based on the second request. The method includes generating a confirmation for the first request using the confirmation date.

In a third aspect, a computer program product is tangibly embodied in a computer-readable storage medium and includes instructions that, when executed, generate on a display device a graphical user interface for specifying an availability determination regarding a ware. The graphical user interface includes a critical part area configured for a user to (i) specify that a part identified in the critical part area is to be recognized as a critical part for providing a ware, and (ii) associate one of a plurality of supply scopes with the critical part for making a first availability determination regarding the critical part. The critical part area is configured so that a second availability determination regarding the ware takes into account the first availability determination regarding the critical part.

Implementations can include any or all of the following features. The graphical user interface can further include a ware area configured for the user to associate one of the plurality of supply scopes with the ware for making the second availability determination regarding the ware. The ware area can further include a replenishment lead time control for the user to define a replenishment lead time to be associated with producing the ware. The ware area can further include a critical parts check box for the user to specify whether to perform the first availability determination regarding the critical part. The graphical user interface can be configured so that a criterion for specifying that the part is to be recognized as the critical part is that the part has a potential of delaying assembly of the ware. The critical part can be defined as made of at least one critical subpart, and the graphical user interface can be configured so that a third availability determination is performed for the critical subpart, the first availability determination taking into account the third availability determination.

Implementations can provide any or all of the following advantages. A confirmation procedure for a demanded ware can be improved. Availability of a critical part of a requested ware can be taken into account in confirming deliverability of the ware. Confirmation dates can be generated that take into account availability delays regarding components.

DESCRIPTION OF DRAWINGS

Like reference symbols in the various drawings indicate like elements.

DETAILED DESCRIPTION

Figure 1:
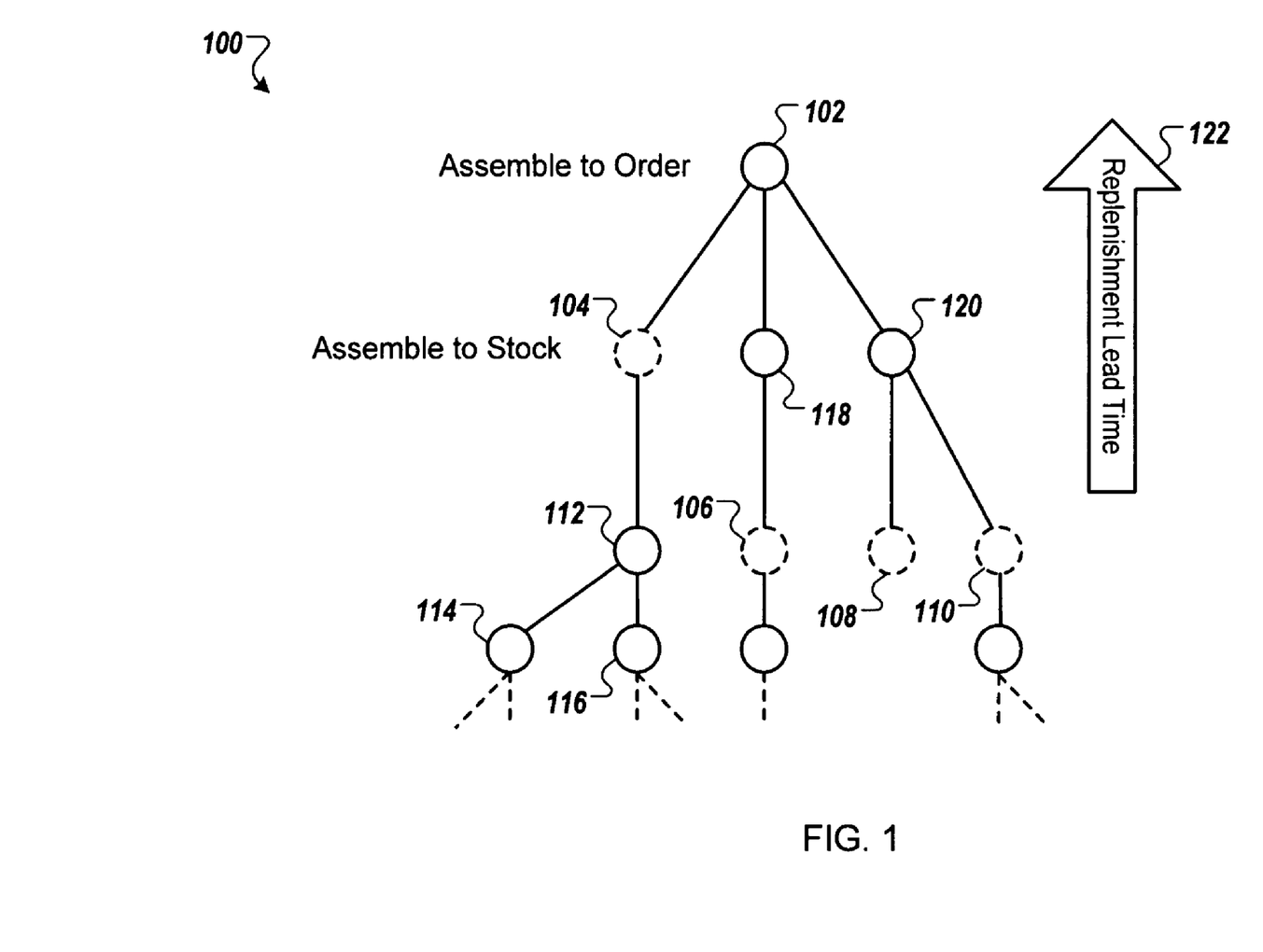
FIG. 1 is a diagram schematically illustrating an example production of a ware according to an assemble-to-order process.

FIG. 1 is a diagram schematically illustrating a production 100 of a ware according to an assemble-to-order process. A customer can request a ware, for example, from a supplier, and the ware may be requested to be delivered by a particular date. An example of a ware is a product produced by a manufacturer, such as a car or a computer system. Wares other than products, such as services, can be supplied and/or demanded. For example, services can be organized using a computer system that schedules availability of consultants or other professionals. Thus, a ware can be either a product or a service, or both, to name some examples. Also, while in some examples it is described that wares of one type are being demanded and supplied, in other implementations more than one type of ware can be supplied, for example by a company having a manufacturing plant that makes many different products.

A ware may be produced using one or more of a make-to-stock process, a make-to-order process, or an assemble-to-order process, to name a few examples. In a make-to-stock process, a ware is manufactured and placed in stock without tying the ware to a particular sales order; when a sales order later is to be satisfied, the ware is delivered to a customer from supplies in stock. A make-to-stock process is a build-ahead approach in which production plans can be based on historical demand and sales forecasts. An example of a ware which can be made using a make-to-stock process is a television set. A planned number of television sets can be produced in advance of orders for television sets.

A make-to-order process, in contrast, is a production approach in which wares are produced upon receipt of a confirmed order (e.g., sales order) and are tied to the order for making the delivery. For example, a make-to-order process may be used for wares which can be highly configurable. An example of a ware which can be processed using a make-to-order process is translation of a document from a source language to a target language.

In an assemble-to-order process, parts and sub-assemblies of a ware can be produced in advance of an order using a make-to-stock process, and a final assembly of parts can be delayed until a confirmed order has been received. Different sets of parts may be assembled for different orders. An assemble-to-order process can be used, for example, if part production times are relatively long compared to part assembly times and if there is a fair amount of commonality of parts between orders. An example of a ware which can be produced using an assemble-to-order process is a computer system for which a customer can choose various configuration options and components.

The sub-parts in an assemble-to-order process may be referred to as assemble-to-stock parts and the final assembly may be referred to as an assemble-to-order ware. For example, an assemble-to-order ware 102 can be assembled upon receipt of a customer order. The assemble-to-order ware 102 here includes assemble-to-stock parts 104-110. Intermediate parts can be used to produce an assemble-to-stock part. For example, intermediate parts 112-116 are used to produce part 104.

Upon receipt of a sales order, the assemble-to-order ware 102 can be assembled. In further detail, the assemble-to-order ware 102 can be assembled from the make-to-stock part 104 and from intermediate assemblies 118-120. An intermediate assembly may be assembled using one or more make-to-stock parts and/or intermediate parts. For example, the intermediate assembly 120 is assembled using make-to-stock parts 108 and 110. Thus, the ware 102 can be made from its constituent components, for example as described above, and can then be ready for delivery according to the specification in the received sales order.

As an illustrative example, the assemble-to-order ware 102 can be a volleyball net system. The volleyball net system can include a net-and-pole assembly, a carrying bag and a support system. The part 104 can be a net-and-pole assembly and the included intermediate parts 112-116 can be a set of poles, a net, and connecting hardware, respectively. The net-and-pole assembly can be produced in advance of an order.

The part 106 can be a choice of a particular carrying bag chosen from a set of carrying bag choices. The intermediate part 118 can be an optional identification tag which the customer may choose to have affixed to a carrying bag. Various styles of carrying bags can be produced in advance of an order. Upon receipt of an order, an identification tag can be affixed to a carrying bag matching the customer's choice of carrying bag.

Continuing with the volleyball net system example, the intermediate part 120 can be a support system. The included part 108 can be a customer's choice of stakes (e.g., longer stakes for sand play, shorter stakes for grass play) and the included part 110 can be a customer's choice of guide ropes (e.g., length and color of rope). The stakes and guide ropes can be produced in advance of an order, and the support system can be assembled, upon receipt of an order, based on the customer's choices of stakes and guide ropes.

An assemble-to-stock part can create a decoupling between an assemble-to-stock process and an assemble-to-order process. For example, the assemble-to-stock part 104 can form a decoupling point between the make-to-stock aspect and the assemble-to-order aspect of the manufacture of the ware 102. The production of the make-to-stock parts 104-110 can be planned in advance based on forecasts. The planning of the assembly of the assemble-to-order ware 102 can be based on scheduling that is triggered by a sales order.

A supplier can use a system that makes an availability determination whether a request for an assemble-to-order ware can be filled by a particular delivery date. As part of planning, a replenishment lead time 122 can be calculated. For example, a replenishment lead time of 12 days can be calculated as the time required to build the assemble-to-order ware 102 from its constituent components. However, if supplies of make-to-stock parts are unavailable, assembly of the assemble-to-order ware can be delayed. As part of the availability determination for an assemble-to-order ware, one or more availability determinations for constituent assemble-to-stock parts can be performed.

Figure 2:
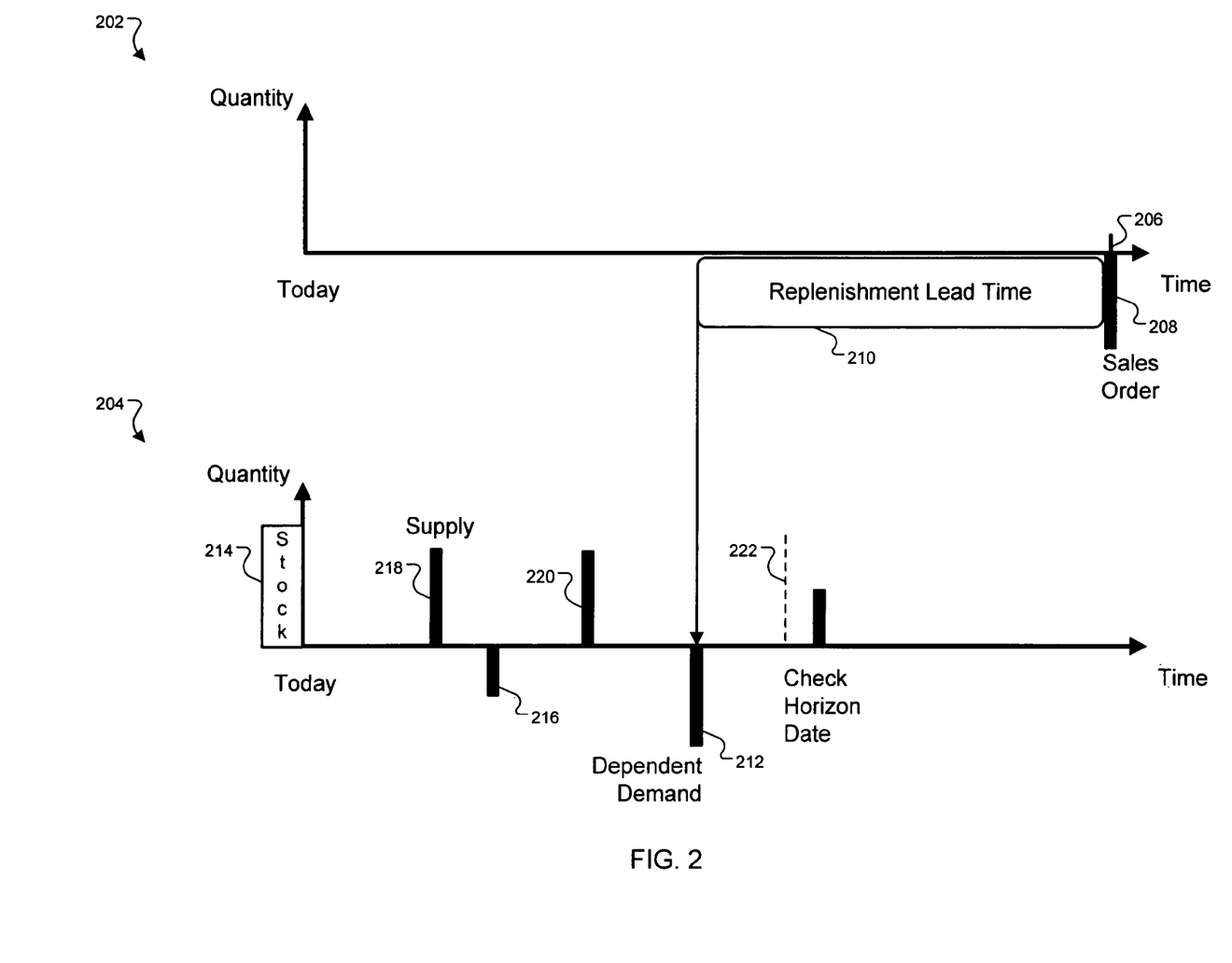
FIG. 2 shows two charts conceptually illustrating an availability determination for an assemble-to-stock part based on a sales order for an assemble-to-order ware.

FIG. 2 shows two charts 202 and 204 conceptually illustrating an availability determination for an assemble-to-stock part based on a sales order for an assemble-to-order ware. The chart 202 graphs quantity supplied and/or demanded of an assemble-to-order ware over time. The chart 204 graphs quantity supplied and/or demanded of an assemble-to-stock part over time. In each chart, supply is here illustrated as an upward staple and demand is here illustrated as a downward staple. A sales order is received for a particular quantity of an assemble-to-order ware. The sales order can be received at any point in time, and includes a request that the ware be delivered by a date in time 206. A demand 208 for the assemble-to-order ware can be considered a downward (i.e., negative) pull on quantity, indicating a demand for a particular quantity of the assemble-to-order ware. Accordingly, in this example the sales order is represented as the demand 208.

The assemble-to-order ware can have an associated replenishment lead time 210. The replenishment lead time 210 can indicate the time required to build the assemble-to-order ware from its constituent components (e.g., from assemble-to-stock parts and/or intermediate parts). For example, the replenishment lead time 210 can be set so that the ware can virtually always be delivered on time, assuming that the demand for the ware is known at least as early as the replenishment lead time 210 before the requested delivery. The replenishment lead time 210 can be calculated, queried, or otherwise determined.

The demand 208 for the assemble-to-order ware in the chart 202 can be mapped to a dependent demand 212 in the chart 204. The dependent demand 212 can represent a demand for an assemble-to-stock part included in the assemble-to-order ware. The dependent demand 212 can be plotted in the chart 204, for example, at a requested date equal to the sales order date 206 minus the replenishment lead time 210.

An availability determination can be performed to determine whether the dependent demand 212 for the assemble-to-stock part can be filled by the requested date. The availability determination can be made using other requests for the assemble-to-stock part and also using current and future supply information. For example, the availability determination can take into account stock on hand 214 and one or more other requests 216 for the assemble-to-stock part.

To provide more precise data regarding the supplier's ability to fill the request for the assemble-to-stock part, the availability determination can be performed in any or all of multiple supply scopes in the supply process. Each supply scope can relate to a particular stage in supplying the assemble-to-stock part. The availability determination can match the requested date to a corresponding supply scope and check the availability based on a scope of availability check associated with the supply scope. For example, an availability determination can, depending on the requested date, take into account ordered parts 218 and parts requested for ordering 220. In general, supply scopes can correspond to the length of time needed for the supplier to plan, request to order, order, and stock an item, to name a few examples.

The requested date can be compared to a check-horizon date 222. The check-horizon date 222 can indicate a date forward in time where a part is considered available. For example, the check-horizon date 222 can represent the total length of time needed to plan, request to order, order, and stock a part. If a requested date falls after the check-horizon date 222, the request can be automatically confirmed, in some implementations.

If the requested date falls before the check-horizon date 222, and if an available supply for the assemble-to-stock part cannot be confirmed, the requested date for the assemble-to-stock part might not be able to be confirmed. However, in this scenario, the check horizon date can be used as a confirmed date. If the assemble-to-stock part cannot be delivered by the requested date, the assemble-to-stock part can delay assembly of the assemble-to-order ware. Thus, an assemble-to-stock part can be considered as a critical part for the assemble-to-order ware due to the potential of delaying the assembly of the assemble-to-order ware.

In the example of FIG. 2, the dependent demand 212 occurs before the check horizon date 222. A supply 220 can be confirmed as available to meet the dependent demand 212. Therefore, the request for the dependent demand 212 can be confirmed at the requested date. Given that the requested date for the dependent demand 212 was requested as the sales order date 206 less the replenishment lead time 210, the demand 208 (e.g., sales order) for the assemble-to-order ware can be confirmed as being able to be fulfilled by the date 206.

Figure 3:
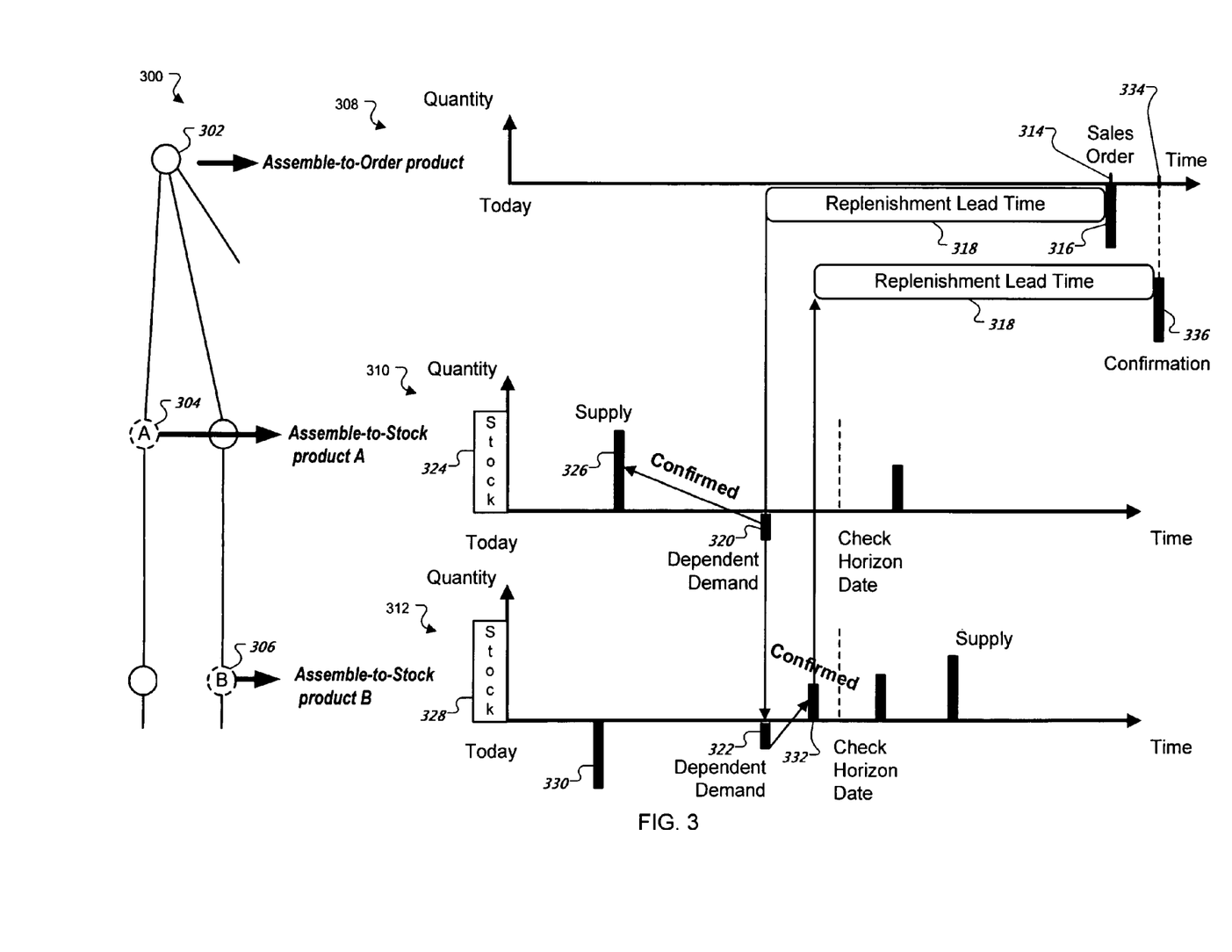
FIG. 3 is a diagram schematically illustrating an approach for making an availability determination regarding a requested ware.

FIG. 3 is a diagram 300 schematically illustrating an approach for making an availability determination regarding a requested ware. An assemble-to-order ware may include multiple assemble-to-stock parts. For example, an assemble-to-order ware 302 is made from an assemble-to-stock part 304 ("product A") and an assemble-to-stock part 306 ("product B"). A chart 308 here graphs quantity supplied and/or demanded of the assemble-to-order ware 302 over time. Similarly, the charts 310 and 312, respectively, here graph quantity supplied and/or demanded of the assemble-to-stock parts 304 and 306 over time. In each chart 308-312, supply is here illustrated as an upward staple and demand is here illustrated as a downward staple.

A sales order is received for a particular quantity of the assemble-to-order ware 302. The sales order can be received at any point in time, and includes a request that the ware 302 be delivered by a date in time 314. A demand 316 for the assemble-to-order ware 302 can be considered a downward (i.e., negative) pull on quantity, indicating a demand for a particular quantity of the assemble-to-order ware 302. Accordingly, in this example the sales order is represented as the demand 316.

The assemble-to-order ware 302 can have an associated replenishment lead time 318. The replenishment lead time 318 can indicate the time required to build the assemble-to-order ware 302 from its constituent components (e.g., from assemble-to-stock parts 304-306 and/or from intermediate parts). For example, the replenishment lead time 318 can be set so that the ware 302 can virtually always be delivered on time, assuming that the demand for the ware 302 is known at least as early as the replenishment lead time 318 before the requested delivery. The replenishment lead time 318 can be calculated, queried, or otherwise determined.

The demand 316 for the assemble-to-order ware 302 can be mapped to a dependent demand 320 in the chart 310 and to a dependent demand 322 in the chart 312. The dependent demand 320 can represent a demand for the assemble-to-stock part 304 so that the product 302 can be manufactured, and the dependent demand 322 can likewise represent a demand for the assemble-to-stock part 306. The dependent demands 320-322 can each be plotted, for example, at a requested date equal to the sales order date 314 minus the replenishment lead time 318.

For each assemble-to-stock part 304-306, an availability determination can be performed to determine whether the respective dependent demand for the assemble-to-stock part can be filled by the respective requested date. Each availability determination can be made using other requests for the respective assemble-to-stock part and also using current and future supply information. As mentioned above, an availability determination can be performed in any or all of multiple supply scopes in the supply process.

For example, the availability determination for the assemble-to-stock part 304 can take into account stock on hand 324 and any supply or demand occurring before the request 320, such as ordered parts 326. In some implementations, the ordered parts 326 represent a finalized order that a specific supply of the parts is to be obtained. As a result of the availability determination, the demand 320 for the assemble-to-stock part 304 in this example can be determined to be met by the ordered parts 326. Since the ordered parts 326 in this example are available before the requested date of the demand 320, the requested date for the demand 320 can be confirmed.

The availability determination for the assemble-to-stock part 306 can take into account stock on hand 328 and any supply or demand occurring before the request 322, such as a request 330. The request 330 can represent another, different request for the assemble-to-stock part 306 (e.g., a request associated with a different sales order). The availability determination for the assemble-to-stock part 306 can determine that sufficient supply might not be available to meet the dependent demand 322 at the requested date. For example, if the stock on hand 328 is used to meet the request 330, enough products may not be available to meet the demand 322.

The availability determination for the assemble-to-stock part 306 can, for example, identify that parts requested for ordering 332 may be available to meet the dependent demand 322. However, in this example the ordered products are scheduled as being available at a date later than the requested date for the demand 322. The demand 322 can therefore be confirmed as available only as of the date of the parts requested for ordering 332. The delay in fulfilling the dependent demand 322 can result in a corresponding delay in meeting the requested sales order date 314 (as mentioned above, this potential for an assemble-to-stock part to delay the production of an assemble-to-order ware can make an assemble-to-stock part a critical part). A confirmed sales order date 334 can be determined by adding the replenishment lead time 318 to the availability date of the parts requested for ordering 332. A confirmed demand 336 can be plotted to represent the fulfillment of the sales order on the date 334. Once the sales order date 334 has been confirmed, a confirmation can be communicated (e.g., to the customer and/or to internal parties such as manufacturing), indicating the sales order date 334 as the confirmed delivery date for the sales order at issue.

In summary, a confirmation date for an assemble-to-order ware can be based on a latest determined confirmation date of any assemble-to-stock part included in the assemble-to-order ware. For example, as shown in FIG. 3, the assemble-to-stock part 304 was determined to be available in time for assembly of the ware 302, but the assemble-to-stock part 306 was determined to be unavailable at the requested date. The delay of fulfilling a demand for one assemble-to-stock part (or for more than one part) has the potential of delaying the assembly of the associated assemble-to-order ware.

Figure 4:
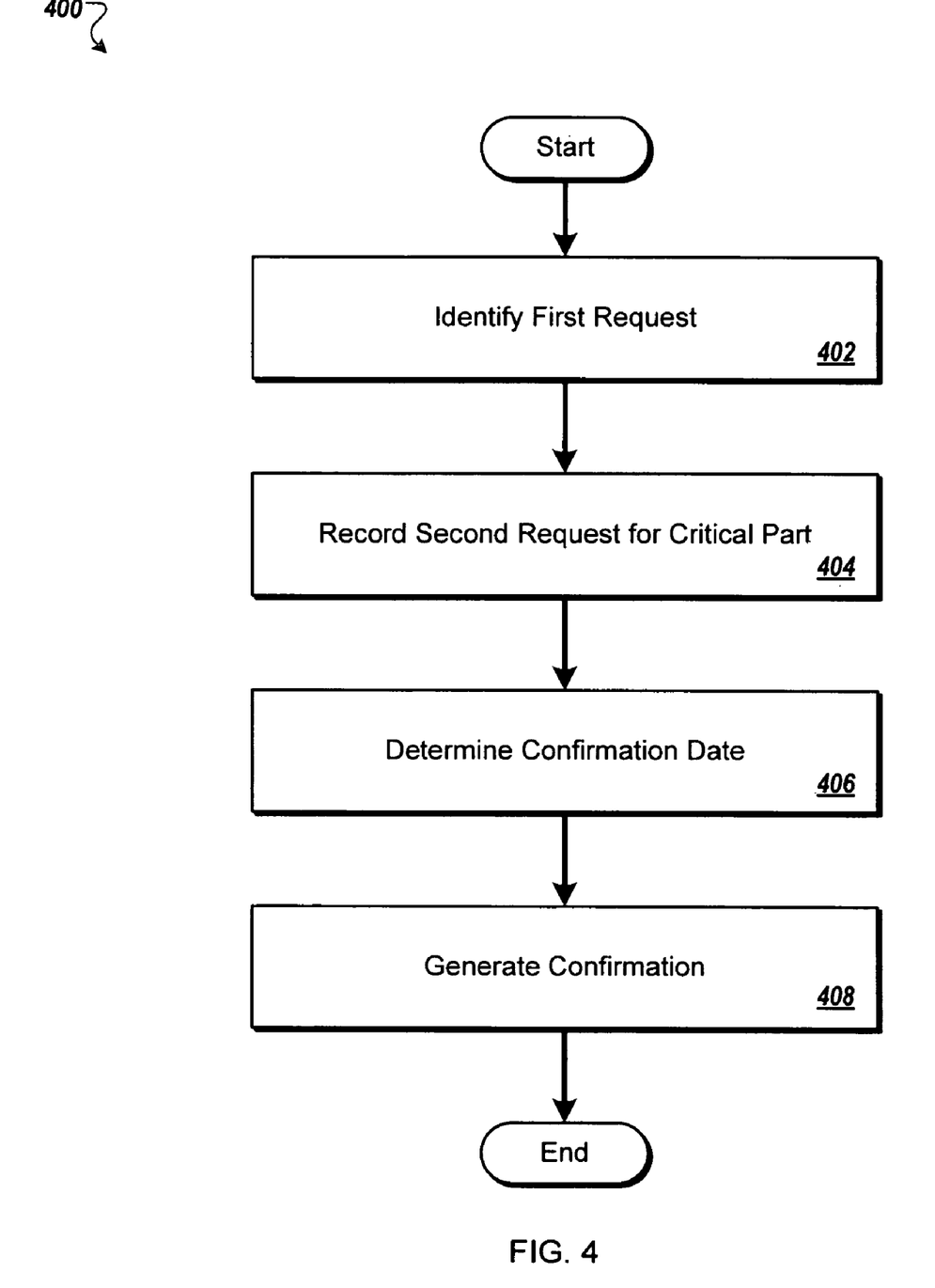
FIG. 4 is a flowchart of a method for making an availability determination regarding a requested ware.

FIG. 4 is a flowchart of a method 400 for making an availability determination regarding a requested ware. In some implementations, the method 400 can be performed by a processor executing instructions in a computer-readable medium, for example in a system that can handle the processing schematically illustrated in any of FIGS. 1-3.

A first request to provide a quantity of a ware at a first date is identified (step 402). For example, FIG. 3 illustrates a sales order for the ware 302 requesting delivery at the date 314. The demand 316 represents the requested quantity of the ware 302.

In response to the first request, a second request for a critical part of the ware is recorded, the second request to be satisfied at a second date selected using the first date (step 404). For example, as shown in FIG. 3, the dependent demand 320 for the assemble-to-stock part 304 can be scheduled for a date equal to the date 314 of the sales order for the ware 302 minus the replenishment lead time 318 of the ware 302. As another example, the dependent demand 322 for the assemble-to-stock part 306 can be scheduled for a date equal to the date 314 minus the replenishment lead time 318.

A confirmation date for the critical part is determined based on the second request (step 406). If the confirmation date for the critical part is consistent with the second date, the confirmation may indicate that the first request is confirmed to be satisfied by the first date. For example, consider the example of FIG. 3 modified so that the assemble-to-stock part 304 is the only assemble-to-stock part included in the ware 302. In this modified example, since the dependent demand 320 is confirmed to be satisfied by the date requested, the demand 316 for the ware 302 can be confirmed to be satisfied by the date 314.

If, however, the confirmation date for the critical part is inconsistent with the second date, the confirmation may indicate a third date, later than the first date, when the first request is confirmed to be satisfied. For example, in FIG. 3, the dependent demand 322 for the assemble-to-stock part 306 is confirmed to be satisfied by the parts requested for ordering 332, where the availability date of the parts requested for ordering is later than the requested date of the dependent demand 322. The delay in satisfying the dependent demand 322 can be mapped to a corresponding delay in the assembly of the ware 302, as indicated by a confirmed date 334 which is later than the requested sales order date 314.

A confirmation for the first request is generated using the confirmation date (step 408). For example, one or more electronic and/or physical (e.g., paper) confirmation messages can be generated and can be communicated to various parties (e.g., to the customer and/or to internal parties such as manufacturing).

Figure 5:
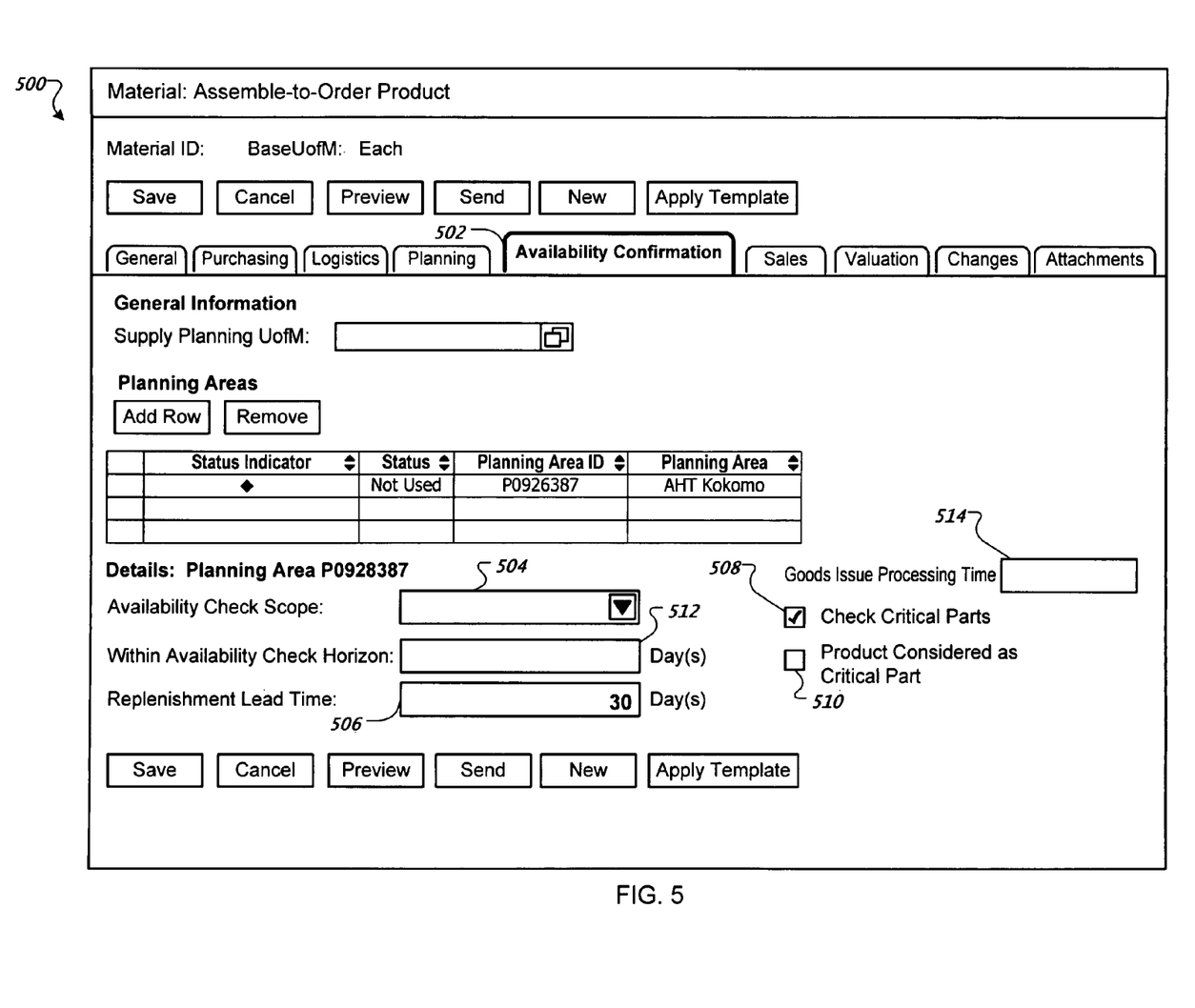
FIG. 5 is an example graphical user interface for configuring an assemble-to-order ware.

FIG. 5 is an example graphical user interface (GUI) 500 for configuring an assemble-to-order ware. The GUI 500 can allow the user to configure one or more of various aspects of computer-usable data about a ware, such as options for purchasing, logistics, planning, sales, and valuation, to name a few examples. In some implementations, data that a user defines for a specific component can be stored for use in any or all processing relating to that component. For example, the stored data can be considered "master data" regarding the specific component.

Using the GUI 500, the user may associate a ware with one or more planning areas. In some implementations, the GUI 500 can be used to create one or more definitions for an assemble-to-order product, such as the product 302 (FIG. 3). The GUI 500 can allow the user to save or cancel edits, preview changes, send changes, apply a template, and other operations. A user may select a tab 502 to configure how availability determination is to be performed for a ware. For example, as will be described below, the user can define the assemble-to-order product as being subject to a check for availability regarding one or more critical parts.

The user may use a control 504 to associate a supply scope with the ware for making an availability determination regarding the ware. A supply scope can be selected from a set of supply scopes. For example, supply scopes can correspond to the length of time needed for the supplier to plan, request to order, order, and stock a ware, to name a few examples. As another example, the supply scope can define that the availability check should take into account one or more of stock on hand, ordered products that have been confirmed, ordered but not yet confirmed products, and planned products.

The user may use a replenishment lead time control 506 to define a replenishment lead time to be associated with producing the ware. For example, a replenishment lead time of 30 days can represent the time required to build an assemble-to-order ware from its constituent components. In some implementations, other replenishment times can be used, for example measured in longer and/or shorter time units than number of days.

A critical parts check box 508 can be selected to specify whether to perform an availability determination regarding any or all critical parts from which the product at issue is to be assembled. For example, an assemble-to-order ware may include one or more assemble-to-stock parts. If the check box 508 is not selected, an availability determination for the assemble-to-order product might be performed without considering availability of one or more associated parts (other information may be considered, however, such as a replenishment lead time for the ware). If the check box 508 is selected, in contrast, the availability of the assemble-to-order product may be determined based also on one or more availability determinations performed for associated assemble-to-stock parts.

A control 510 can be selected to indicate that a ware is considered as a critical part in that it is included as a part in another ware and may delay production of the other ware. Examples of configuring parts are described below. Using GUI 500, other options can be configured, such as using a control 512 to configure an availability check horizon or a control 514 to configure a goods issue processing time.

Figure 6:
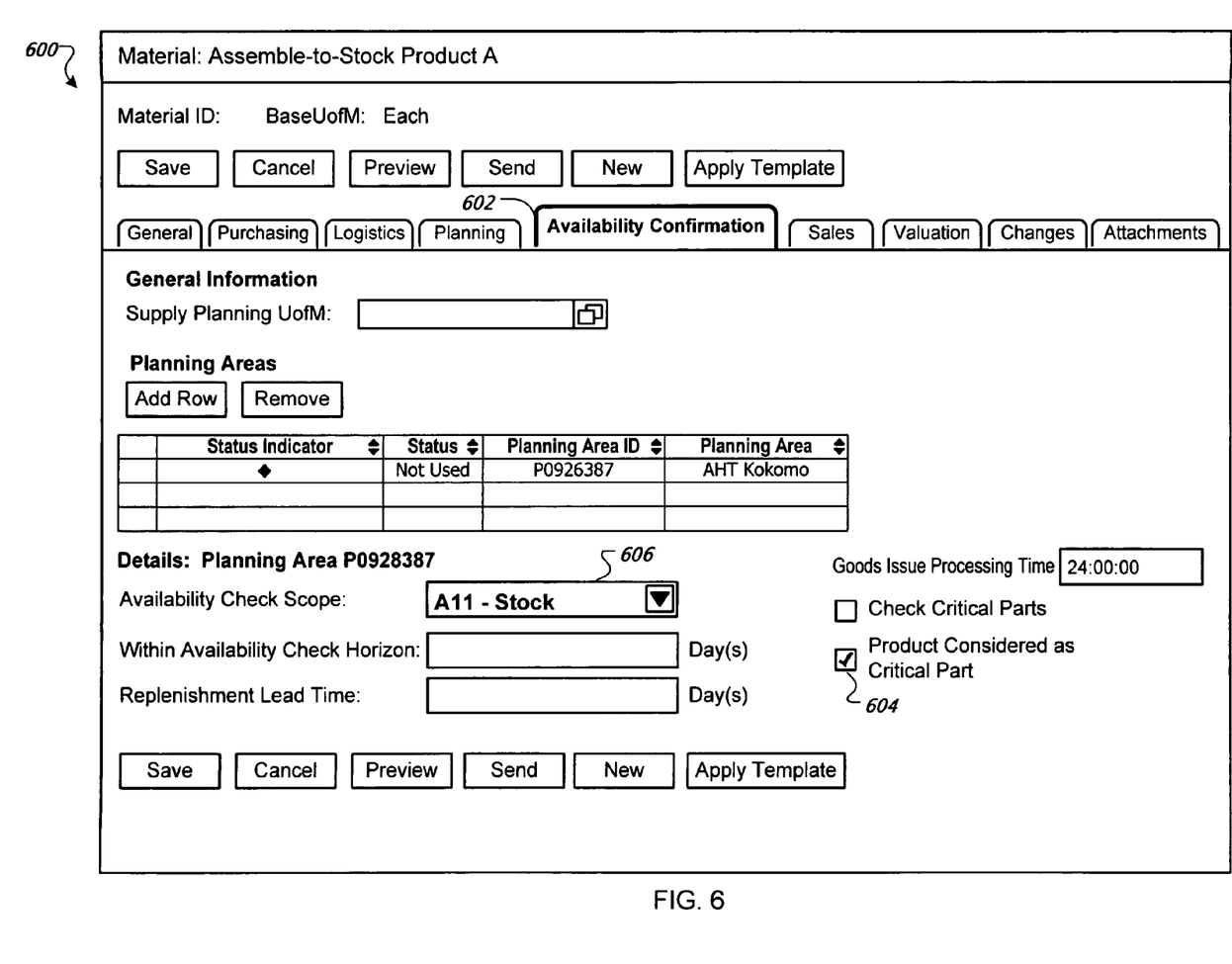
FIG. 6 is an example graphical user interface for configuring an assemble-to-stock part.

FIG. 6 is an example graphical user interface for configuring an assemble-to-stock part. An assemble-to-stock part may be included in one or more assemble-to-order wares. Similar to the GUI 500, the GUI 600 can be used to configure various aspects of a part, such as options for purchasing, logistics, planning, sales, and valuation. Using the GUI 600, the user may associate a part with one or more planning areas. The GUI 600 allows the user to save or cancel edits, preview changes, send changes, apply a template, and other operations. A user may select a tab 602 to configure availability determination for a part.

The user may select a control 604 to specify that a part is to be recognized as a critical part for providing a ware. If the control 604 is selected, availability determinations performed for a ware that includes the part may take into account an availability determination for the part (and possibly for other parts) included in the ware.

The user may use a control 606 to associate one of a plurality of supply scopes with a part for making an availability determination regarding the part (e.g., as part of an availability determination regarding a ware which includes the part). For example, supply scopes can correspond to the length of time needed for the supplier to plan, request to order, order, and stock a ware, to name a few examples.

Thus, in some implementations, the GUIs 500 and 600 can be used as follows, for example. Details regarding availability determination for a ware can be defined using the GUI 500, including a setting of a flag (or other indicator) that the ware is made from one or more critical parts and that critical-part availability should be checked. In GUI 600, moreover, availability determination for the critical part can be defined, including a supply scope and/or a replenishment lead time to be used. Other approaches can be used.

Figure 7:
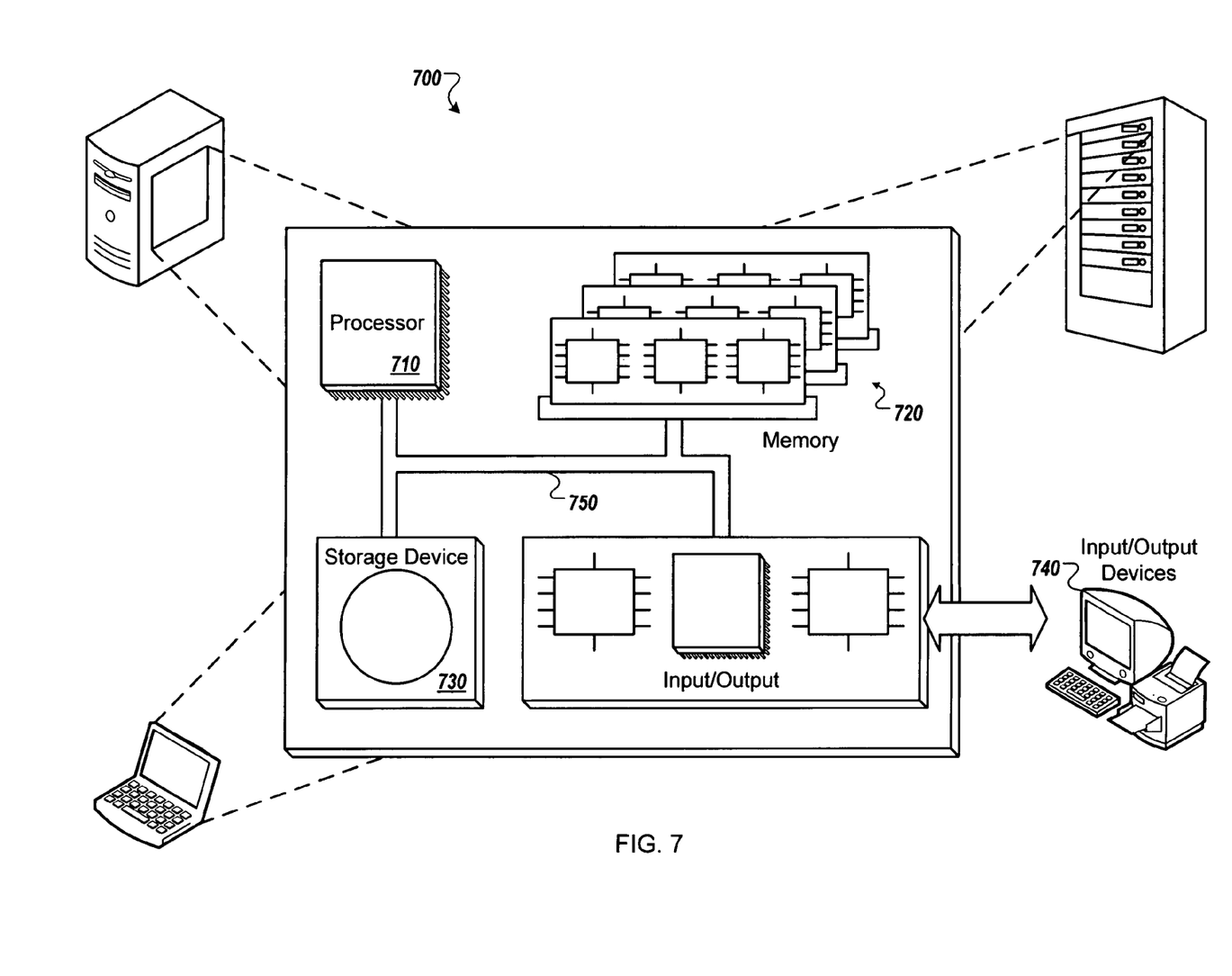
FIG. 7 is a block diagram of a computing system that can be used in connection with computer-implemented methods described in this document.

FIG. 7 is a schematic diagram of a generic computer system 700. The system 700 can be used for the operations described in association with any of the computer-implement methods described previously, according to one implementation. The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method for making an availability determination regarding a requested ware, the method comprising:
    identifying, using a computer system, a first request from a customer to a manufacturer to provide a quantity of a ware to the customer at a first date, the manufacturer to provide a first confirmation date for the first request that is either the first date or a later date;
    recording, in the computer system and in response to the first request, a second request for a critical part of the ware, the second request to be satisfied at a second date selected using the first date, the quantity of the ware to be manufactured by assembling parts in an assemble-to-order process, of which parts at least the critical part is to be manufactured in a make-to-stock process, wherein the first request is a demand against the assemble-to-order process and the second request is a demand against the make-to-stock process;
    determining, using the computer system, a second confirmation date for the critical part based on the second request;
    generating, using the computer system, a confirmation for the first request that specifies the first confirmation date for the first request as either the first date or the later date based on the second confirmation date for the critical part; and
    sending the confirmation to the customer in response to the first request using the computer system.

2. The computer-implemented method of claim 1, wherein the confirmation date is consistent with the second date, and wherein the confirmation indicates that the first request is confirmed to be satisfied by the first date.

3. The computer-implemented method of claim 1, wherein the confirmation date is inconsistent with the second date, and wherein the confirmation indicates a third date, later than the first date, when the first request is confirmed to be satisfied.

4. The computer-implemented method of claim 1, further comprising:
    identifying a replenishment lead time associated with producing the ware; and
    defining the second date as the first date less the replenishment lead time.

5. The computer-implemented method of claim 1, further comprising:
    identifying one of a plurality of supply scopes associated with the critical part for making an availability determination; and
    making the availability determination using the identified supply scope.

6. The computer-implemented method of claim 1, wherein the ware is scheduled to be produced according to an assemble-to-order process in which the ware is produced by assembling components including the critical part that have been produced according to a make-to-stock process ahead of the first request.

7. The computer-implemented method of claim 6, wherein the critical part forms a decoupling point between the make-to-stock process and the assemble-to-order process.

8. The computer-implemented method of claim 6, wherein generating the confirmation comprises:
    performing a first availability determination for the critical part regarding the second date; and
    performing a second availability determination for the ware regarding the first date.

9. The computer-implemented method of claim 8, wherein the first availability determination is performed using one of a plurality of supply scopes associated with the critical part for making an availability determination.

10. The computer-implemented method of claim 8, wherein the second availability determination is performed using one of a plurality of supply scopes associated with the ware for making an availability determination.

11. The computer-implemented method of claim 9, wherein the critical part is defined as made of at least one critical subpart, further comprising:
    performing a third availability determination for the critical subpart, wherein the first availability determination takes into account the third availability determination.

12. The computer-implemented method of claim 1, wherein a criterion for specifying that the part is to be recognized as the critical part is that the part has a potential of delaying assembly of the ware.

13. A computer program product tangibly embodied in a non-transitory computer-readable storage medium and comprising instructions that when executed by a processor perform a method for making an availability determination regarding a requested ware, the method comprising:

identifying a first request from a customer to a manufacturer to provide a quantity of a ware to the customer at a first date, the manufacturer to provide a first confirmation date for the first request that is either the first date or a later date;

recording, in response to the first request, a second request for a critical part of the ware, the second request to be satisfied at a second date selected using the first date, the quantity of the ware to be manufactured by assembling parts in an assemble-to-order process, of which parts at least the critical part is to be manufactured in a make-to-stock process, wherein the first request is a demand against the assemble-to-order process and the second request is a demand against the make-to-stock process;

determining a second confirmation date for the critical part based on the second request;

generating a confirmation for the first request that specifies the first confirmation date for the first request as either the first date or the later date based on using the second confirmation date for the critical part; and sending the confirmation to the customer in response to the first request using the computer system.

* * * * *